Feb. 12, 1946.  R. SEITZ  2,394,812

LOCKNUT

Filed Nov. 6, 1943

INVENTOR.
Richard Seitz
BY Ely & Frye
ATTORNEYS

Patented Feb. 12, 1946

2,394,812

UNITED STATES PATENT OFFICE 2,394,812

LOCK NUT

Richard Seitz, Cleveland, Ohio

Application November 6, 1943, Serial No. 509,197

3 Claims. (Cl. 151—21)

This invention relates to an improvement in locknuts and, more particularly, to a self-locking jam nut unit which also serves as a torque gauge.

The use of a jam nut is an old and well-known expedient for locking nuts. Because the threading of a jam nut requires as much time as the threading of the base nut and because there is a tendency to over-tighten the jam nut, thus causing the threads to strip under load, jam nuts are used comparatively seldom in mass production and assembling; instead the locking arrangements usually employed are the more expensive and cumbersome castellated nuts or the less expensive, but less secure and breakable, lock washers.

It is the object of this invention to provide a jam nut unit which can be assembled and tightened on a thread or bolt substantially as quickly as a single non-locking nut. It is also an object of this invention to provide a jam nut unit which, in and of itself, will serve as a torque gauge and indicate optimum tightening of the nut.

Other advantages of this invention are that the unit is inexpensive, readily manufactured on standard automatic machines without requiring expensive machining operations. Another advantage of my invention is that, in its preferred form, there is no hard extraneous element which is likely to mar or injure the threads of either the nut or bolt. A unit made according to my invention will not have burrs or bosses to interfere with socket wrenches or other end wrenches; likewise, the locking action of my unit is not dependent upon small pins or washers which are likely to break or rust away during use. A still further advantage of my invention is that it employs no small washers or cotter pins which are likely to be lost and not replaced during repairs.

Other objects and advantages of my invention will be apparent from the following specification, claims, and drawing, in which:

Figure 1:
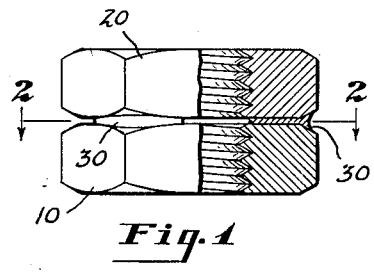
Fig. 1 is an elevation, partly in section, showing a locking unit made according to my invention.
Figure 3:
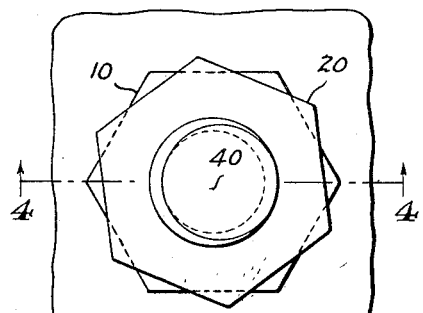
Fig. 3 is a plan view showing my nut unit in use.
Figure 2:
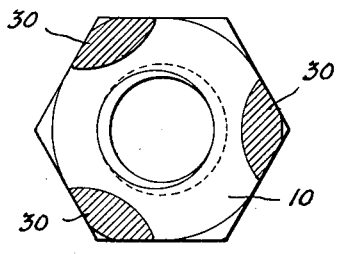
Fig. 2 is a section taken along the line 2—2 of Fig. 1.
Figure 4:
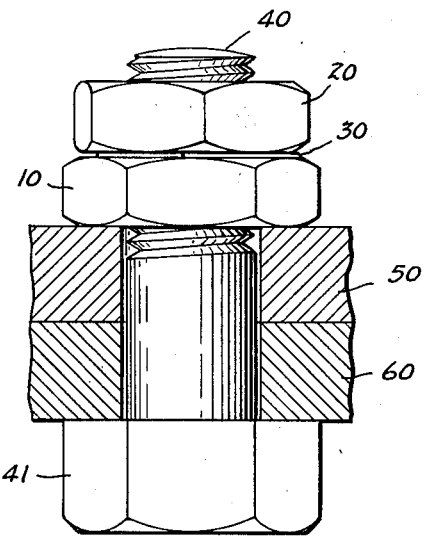
Fig. 4 is a section taken along the line 4—4 of Fig. 2.

The embodiment of my unit as shown in Figs. 1 and 2 of the drawings comprises two half-nuts 10 and 20 superimposed so that the bores of the nuts are coaxial. The two nuts are joined by bonds of solder 30, shown in section in Fig. 2. The thickness of the bonds of solder is such that the threads of the superimposed nuts are "on pitch," that is, the thread of each nut will lie on the same helix as the thread of the adjacent nut. In the event double-thread nuts are employed, each thread of one nut will, of course, be on pitch with a corresponding thread of the adjacent nut.

The half-nuts 10 and 20 may be manufactured in any conventional manner, as on automatic nut machines. To assemble the unit by hand, the nuts are threaded on a threaded arbor preferably having its threads cut or ground to a much closer tolerance than that of the automatically cut or rolled threads of the bolts on which the nut unit is to be used. With the upper nut backed away from the lower nut, spots of solder are applied in the space formed by the adjacent surfaces of the nuts. When the solder has sweated into the space between the nuts and frozen, the unit is unthreaded from the mandrel. Burrs and nodules of solder may be removed by buffing or tumbling. Substantially the same procedure may be followed in manufacturing the unit on semi-automatic machinery employing an intermittently driven arbor or means to drive the nut on and off a fixed threaded arbor.

It is important that the space between the nuts be sufficient so that the spots of solder will be relatively weak in shear. In standard hexagonal nuts, the spacing is preferably equal to that obtained when one nut is backed away from the other by one-sixth to one-third of a turn. If the spacing is less, the skin strength of the solder may prevent easy breaking of the bond; if the spacing is greater, solder is wasted. It is to be understood, of course, that organic metal cements, glues, and the like may be used in place of the bonds of solder. The area of the bonding spots 30 is preferably limited so that the shear strength of the bond is approximately equal to the torque intended to be applied to the unit. If solder is employed for the bond, the area of the bond may be readily controlled by applying grease to the areas not intended to be bonded.

To use my unit, the unit is threaded on the bolt 40 until the members 50 and 60, the members to be fastened together, are firmly engaged between the bolthead 41 and the lower nut 10. Applying additional torque only to the upper nut 20, the unit is turned until the bonds of solder 30 are sheared. After the bonds 30 are ruptured, approximately one-sixth of an additional turn will securely jam the nuts 10 and 20. At the same time, the rupture of the bonds 30 has served as a gauge for the optimum amount of torque to be applied to the unit. The soft solder of the bond will tend to be extruded by the additional tightening of the upper nut 20, but the soft solder will not nick or injure the threads of the nuts or the bolt. Since the major portion of the load is carried by the top nut 20, it is important that the top nut should not be over-tightened; otherwise the threads of the nut or bolt may be stripped under load.

Figure 5:
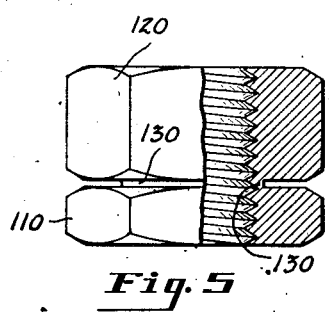
Fig. 5 is a view similar to Fig. 1 showing a modification of my unit.

The modification shown in Fig. 5 is an embodiment of my invention which may be wholly manufactured on standard automatic nut machines. Assuming that the unit is to comprise a standard top nut 120 and a bottom half-nut 110, the machine is set to drill and tap the hexagonal bar stock to the depth required for a one and one-half nut. Assuming that the machine employed is capable of being set so that the bar stock may be alternately advanced for whole and half-nuts, the stock is advanced for a half-nut, the bevel cut is made and then a parting tool cut is taken until the cut approaches the threads. Then the parting tool is withdrawn, the stock is advanced for a whole nut and the unit is cut off in the usual manner, producing a unit comprised of the half-nut 110 and a whole nut 120 joined by an integral cylindrical bond 130. If the machine employed is not capable of being set for alternate feeds of the bar stock, the bevel cuts for the parting between the nuts 110 and 120 are taken before the stock is placed in the machine. A thin bladed circular power saw is mounted on the machine opposite the cut-off tool but spaced axially away from the cut-off tool by a distance equal to the thickness of a half-nut. With the machine set to feed one and one-half nut lengths, as the cut-off is taken a half-nut length from the pre-cut bevel, the power saw is brought against the pre-cut bevel to make the parting between the nuts 110 and 120.

The embodiment shown in Fig. 5 is a self-locking jam nut unit similar to that shown in Figs. 1 and 2 and is used in the same manner. Its advantages are that it is cheaper than the unit shown in Figs. 1 and 2 and, because the areas of the bond 130 may be accurately controlled, the unit serves as an accurate torque gauge; its disadvantage is that the bond 130 may not shear clean, thus leaving tangs that may injure the bolt threads when the nuts are removed. This disadvantage may be largely circumvented, however, by employing clean-shearing bar stock free from slag stringers.

Units made according to my invention may be more secure than the conventional jam nuts because rupture of the bond gives a warning against overstressing the threads. The bonds, themselves, also tend to secure the nuts. If the solder type of bond is employed, extrusion of the solder into the threads further secures the nuts. If the integral bond as shown in Fig. 5 is employed, the bond is compressed after shearing, thus pinching the bolt threads.

It is to be understood, of course, that my invention is not limited to the specific embodiments disclosed but by the following claims.

What is claimed is:

1. As an article of manufacture, a jam nut unit comprising a pair of coaxially aligned nuts having their threads on pitch, a bond of solder uniting said nuts and maintaining said alignment, said solder bond having an ultimate torsional shear strength less than the minimum shear strength of the threads of one of said nuts.

2. As an article of manufacture, a jam nut unit comprising a pair of coaxially aligned nuts having their threads on pitch, and a bond of solder uniting said nuts and maintaining said alignment.

3. An article of manufacture as defined in claim 2 in which said bond of solder spaces said nuts from each other by a distance ranging between one-sixth and one-third of the pitch of the threads of said nuts.

RICHARD SEITZ.